US011389850B2

(12) United States Patent
Dani

(10) Patent No.: US 11,389,850 B2
(45) Date of Patent: Jul. 19, 2022

(54) METHOD FOR MANUFACTURING COMPLEX-CURVATURE TUBULAR PRODUCTS, SUCH AS ELM COILS

(71) Applicant: CTE SISTEMI S.R.L., Genoa (IT)

(72) Inventor: Marco Dani, Genoa (IT)

(73) Assignee: CTE SISTEMI S.R.L., Genoa (IT)

( * ) Notice: Subject to any disclaimer, the term of this patent is extended or adjusted under 35 U.S.C. 154(b) by 0 days.

(21) Appl. No.: 17/256,315

(22) PCT Filed: Jul. 10, 2019

(86) PCT No.: PCT/IB2019/055876
§ 371 (c)(1),
(2) Date: Dec. 28, 2020

(87) PCT Pub. No.: WO2020/012376
PCT Pub. Date: Jan. 16, 2020

(65) Prior Publication Data
US 2021/0260638 A1    Aug. 26, 2021

(30) Foreign Application Priority Data
Jul. 11, 2018 (IT) .................. 102018000007100

(51) Int. Cl.
*B21D 7/08* (2006.01)
*B21D 7/02* (2006.01)
(Continued)

(52) U.S. Cl.
CPC ............... *B21D 7/085* (2013.01); *B21D 7/02* (2013.01); *B21D 11/06* (2013.01); *B21D 21/00* (2013.01)

(58) Field of Classification Search
CPC ............ B21D 7/02; B21D 7/022; B21D 7/08; B21D 7/085; B21D 11/06; B21D 11/10;
(Continued)

(56) References Cited

U.S. PATENT DOCUMENTS 4,938,050 A * 7/1990 Kimura .................. B21D 7/022
72/217
2013/0333432 A1* 12/2013 Honda .................. H01F 41/098
72/66

FOREIGN PATENT DOCUMENTS

DE     19648169 A1    6/1998
JP     H08112623 A    5/1996
JP     2003266127 A   9/2003

OTHER PUBLICATIONS

European Patent Office, International Search Report, issued in PCT/IB2019/055876, dated Oct. 7, 2019, Rijswijk, Netherlands.
(Continued)

*Primary Examiner* — Teresa M Ekiert
(74) *Attorney, Agent, or Firm* — Ferguson Case Orr Paterson

(57) ABSTRACT

A method for manufacturing a complex-curvature tubular product starting from a metal tube extending along a rectilinear longitudinal axis is provided. The method includes carrying out, by a first bending device, a plurality of first bending operations, each first bending operation being carried out on a respective first straight portion of the metal tube, and in a bending plane passing through the longitudinal axis, so that the metal tube leaving the first bending device has a respective plurality of first curved portions, separated by second straight portions, and carrying out on the metal tube leaving the first bending device, by a second bending device, a plurality of second bending operations, each second bending operation being carried out on one of the second straight portions so that the metal tube leaving the second bending device has, between each pair of consecutive first curved portions, a respective second curved portion, and the tubular product thus obtained has first and second curved portions immediately adjacent to each other.

6 Claims, 5 Drawing Sheets

(51) Int. Cl.
*B21D 11/06* (2006.01)
*B21D 21/00* (2006.01)

(58) Field of Classification Search
CPC .... B21F 3/02; B21F 3/027; B21F 3/08; B21F 35/04
See application file for complete search history.

(56) References Cited

OTHER PUBLICATIONS

European Patent Office, Written Opinion, issued in PCT/IB2019/055876, dated Oct. 7, 2019, Rijswijk, Netherland.

* cited by examiner

METHOD FOR MANUFACTURING COMPLEX-CURVATURE TUBULAR PRODUCTS, SUCH AS ELM COILS

CROSS-REFERENCE TO RELATED APPLICATIONS

This application is a National Phase Application of PCT International Application No. PCT/IB2019/055876, having an International Filing Date of Jul. 10, 2019 which claims the benefit of priority to Italian Patent Application No. 102018000007100, filed Jul. 11, 2018, each of which is hereby incorporated by reference in its entirety.

FIELD OF THE INVENTION

The present invention relates in general to a method for manufacturing tubular products. In particular, the present invention relates to a method for manufacturing complex-curvature tubular products, that is, tubular products with immediately adjacent curved portions, each of which is bent in a respective bending plane.

A further aspect of the invention relates to an apparatus for manufacturing tubular products of the type described above.

The term "tubular product" used in the following description and claims is to be intended as referring to any product obtained from a metal tube (whose cross-section may be of different shapes, in particular of circular shape) or to an analogous elongated semi-finished product, such as a rod or a profiled section.

BACKGROUND OF THE INVENTION

Several methods for obtaining tubular products by carrying out bending operations on metal tubes are known. Generally, depending on the geometries to be obtained and on the material of the tube to be bent, the bending operations may be carried out by using, for example, roller-type bending devices or die-type bending devices.

When bending with a roller-type bending device, an initially straight metal tube is moved forward in the direction of its own longitudinal axis and caused to pass through at least three rollers arranged alternatively on opposed sides of the tube, an intermediate roller of said at least three rollers being movable transversally, that is, substantially perpendicularly to the longitudinal axis of the tube. While the tube is being moved forward in the direction of its own longitudinal axis, the more the intermediate roller is pressed against the tube towards the longitudinal axis of the tube, the smaller the bending radius of the tube that is obtained. By changing the relative orientation of the tube with respect to the bending device, that is, with respect to the three rollers of the bending device, it is possible to change the orientation of the bending plane of the tube in the space.

While on the one hand the roller-type bending devices have the advantage of ensuring a high dimensional and geometrical precision, on the other it is almost impossible with this type of bending devices to obtain complex-curvature tubular products, by carrying out sequentially bending operations on immediately adjacent portions of the tube. In fact, a roller-type bending device plastically deforms the tube with the intermediate roller, while the other rollers act on portions of the tube, either straight or curved, that lie on the plane of the tube. In particular, the problem of obtaining immediately adjacent curved portions with bends lying on different bending planes is particularly hard to overcome if, considering two adjacent bends, the first one to be obtained has even a significantly small bending radius.

JP-A-2003266127 discloses a tube bending machine having a single bending device able to carry out two different types of bending operations on the tube depending on the bending radius to be obtained.

DE 196 48 169 A1 discloses a bending machine having two separate bending devices, each intended to carry out a respective type of bending operation.

The method of the present invention has been conceived with specific reference to the manufacturing of so-called ELM (Edge Localized Mode) coils for nuclear fusion reactors, that is to say, coils for controlling edge-localised plasma instability. These coils are tubular products having a particularly complex geometry, with a sequence of immediately adjacent curved portions, and must be manufactured with very strict tolerances.

As will be clear from the following description, the invention shall not be considered as limited to the manufacturing of ELM coils, but may also be applied to the manufacturing of other types of complex-curvature tubular products.

SUMMARY OF THE INVENTION

It is an object of the present invention to provide a manufacturing method that allows to obtain complex-curvature tubular products with high precision, and that is thus suitable for the manufacturing, for example, of ELM coils.

This and other objects are fully achieved by a method and an apparatus as described and claimed herein.

Advantageous embodiments of the present invention are also described.

In short, the invention is based on the idea of providing a method for manufacturing a complex-curvature tubular product from a metal tube extending along a rectilinear longitudinal axis, comprising the steps of:

a) carrying out, by means of a first bending device, preferably a roller-type bending device, a plurality of first bending operations, each on a respective first straight portion of the tube, and each in a bending plane passing through the longitudinal axis, in such a manner that the tube leaving said first bending device comprises a respective plurality of first curved portions, separated by second straight portions; and b) carrying out on the tube leaving said first bending device, by means of a second bending device, preferably a die-type bending device, a plurality of second bending operations, each on one of second straight portions, in such a manner that the tube leaving said second bending device comprises, between each pair of consecutive first curved portions, a respective second curved portion, and that the tubular product thus obtained comprises first and second curved portions immediately adjacent to each other.

The invention also relates to an apparatus for manufacturing complex-curvature tubular products from a metal tube extending along a rectilinear longitudinal axis, comprising:

a feeding device adapted for feeding the tube along the direction of its longitudinal axis, a first bending device which is made as a roller-type bending device and is arranged downstream of the feeding device for carrying out bending operations on the tube fed thereto by the feeding device, a second bending device which is made as a die-type bending device and is arranged downstream of said first bending device for carrying out bending operations on the tube leaving said first bending device, and support means arranged between said first and second bending device for supporting the tube leaving said first bending device.

By virtue of such a method and of such an apparatus it is possible to manufacture complex-curvature tubular products, that is, tubular products having immediately adjacent curved portions, such as for example ELM coils.

BRIEF DESCRIPTION OF THE DRAWINGS

Further features and advantages of the present invention will be clear from the following detailed description, given purely by way of non-limiting example with reference to the appended drawings, wherein.

DETAILED DESCRIPTION OF THE INVENTION

Figure 1:
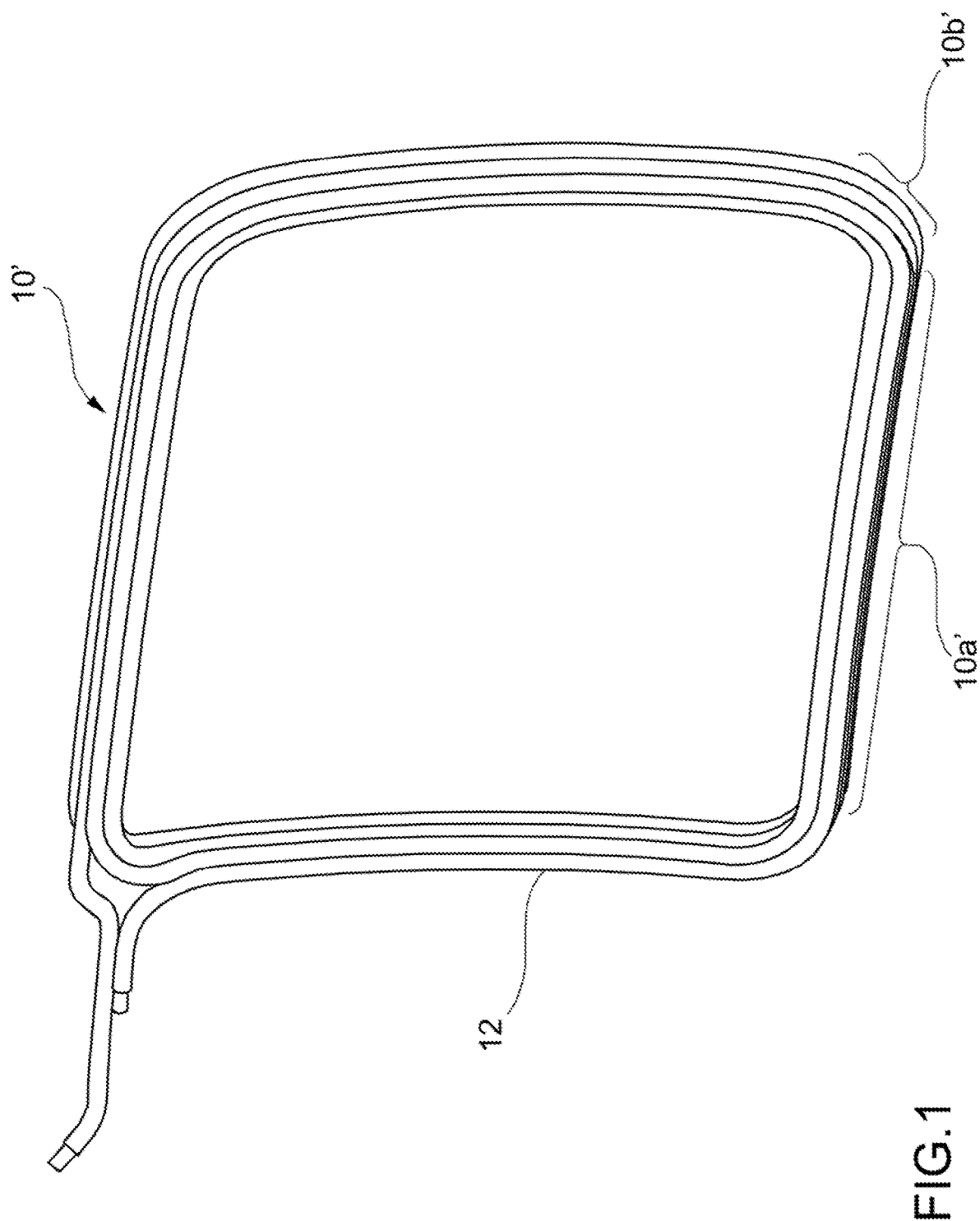
FIG. 1 is a perspective view of an ELM coil as an example of a complex-curvature tubular product that can be manufactured by means of a method according to the invention.

With reference first to FIG. 1, a tubular product obtainable by means of a method according to the invention is generally indicated with 10'. The tubular product 10' comprises first and second curved portions 10a' and 10b', alternated and immediately adjacent to each other. In particular, the second curved portions 10b' have a smaller bending radius than that of the first curved portions 10a'. As an example of tubular product 10' obtainable by means of the method of the invention, an ELM coil is shown in FIG. 1, which coil comprises a plurality of coil sections 12, each having a plurality of curved sides, corresponding to the first curved portions 10a', and, between each pair of consecutive curved sides, a joining portion, corresponding to a second curved portion 10b', with a smaller bending radius than that of the curved sides. For example, the coil 10' may have six coil sections 12, each with four sides 10a', connected to each other by means of four joining portions 10b'. Clearly, the number of coil sections and of sides may be chosen at will, depending on the requirements the coil has to meet.

Figure 2:
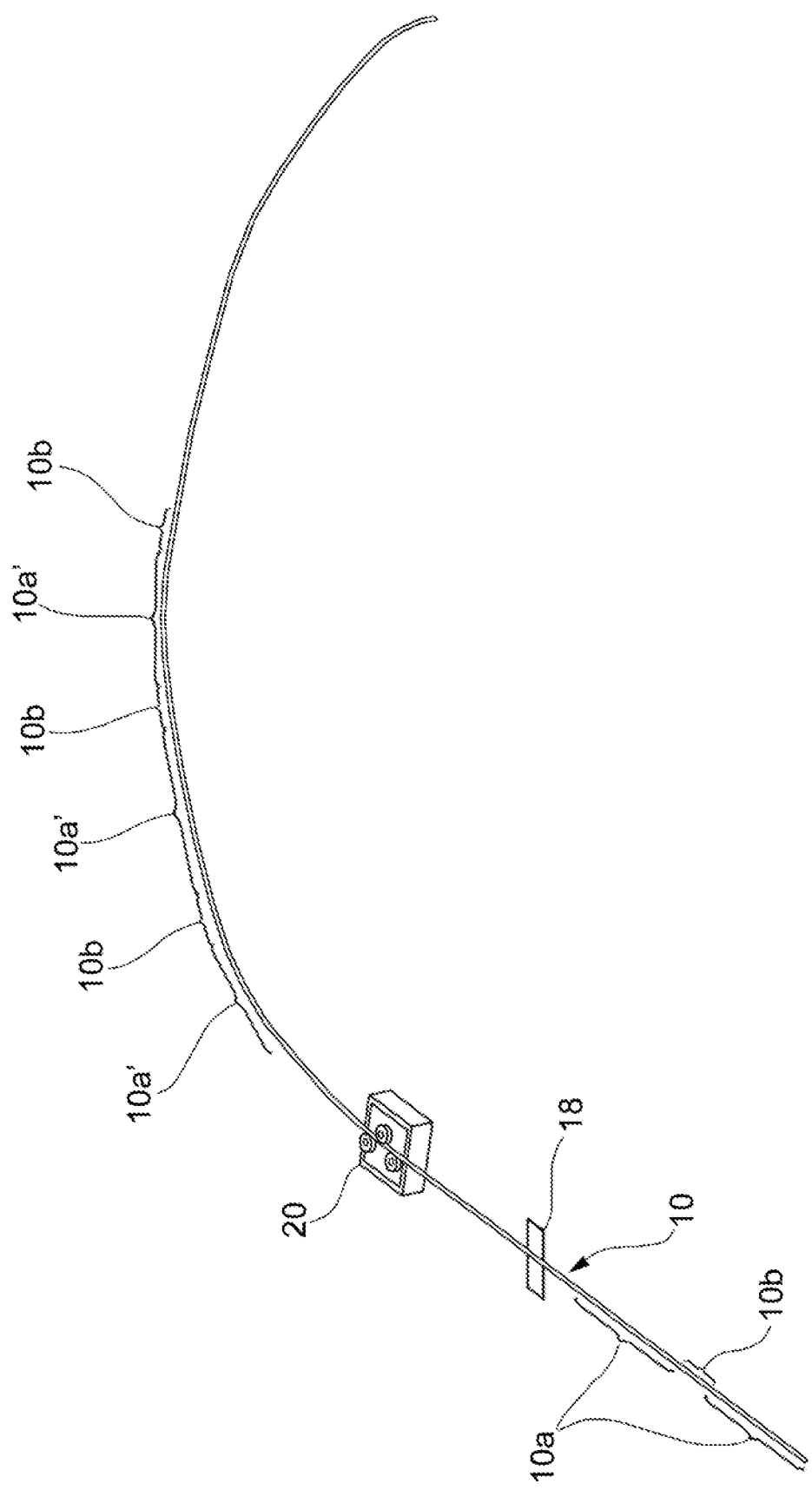
FIG. 2 shows schematically a first step of the method according to the invention for obtaining the tubular product of FIG. 1.
Figure 3:
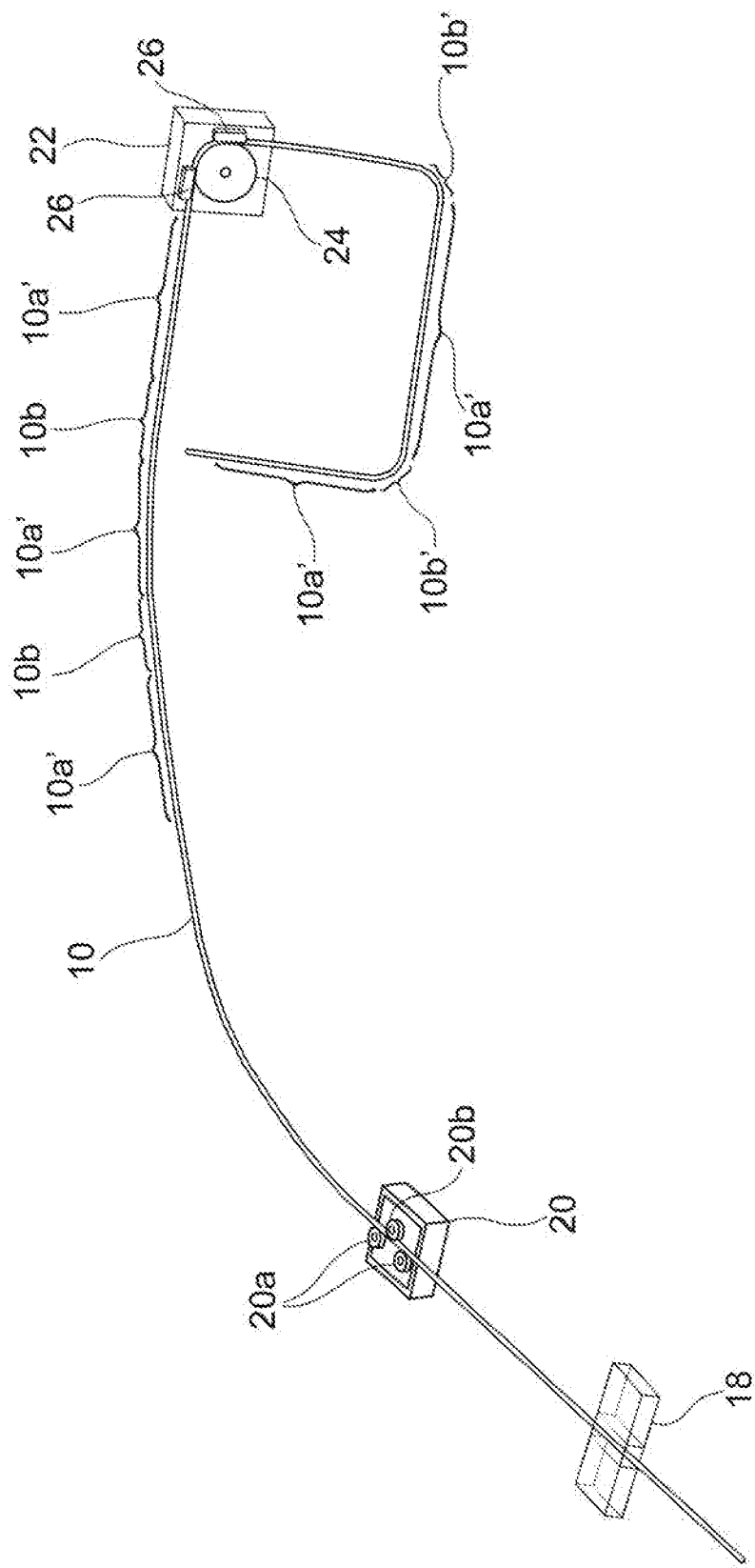
FIG. 3 shows schematically a second step of the method according to the invention for obtaining the tubular product of FIG. 1.

With reference now to FIGS. 2 and 3, the method for manufacturing the tubular product 10' from a metal tube 10 will be described.

The tube 10 is represented in the drawings as a tube with a circular cross-section but may have a cross-section with a shape other than circular.

The longitudinal axis x, initially rectilinear, of the tube 10 is indicated with x. First straight portions of the tube 10 corresponding, in the final tubular product 10', to said first curved portions 10a', are indicated with 10a, while second straight portions of the tube 10 corresponding, in the final tubular product 10', to said second curved portions 10b', are indicated with 10b. As shown in FIG. 2, the first straight portions 10a alternate with the second straight portions 10b and extend immediately adjacent to the second straight portions 10b.

The tubular product 10' is obtained according to the invention by a manufacturing method basically comprising the steps of:

a) carrying out a plurality of first bending operations, each on a respective first straight portion 10a of the tube 10, by means of a first bending device 20, and b) carrying out a plurality of second bending operations, each on a respective second straight portion 10b of the tube 10, by means of a second bending device 22.

In particular, FIG. 2 shows said step a), wherein the tube 10 is fed, by means of a feeding device 18 (which is known per se and is thus shown only schematically in the drawing), to the first bending device 20 for carrying out said first bending operations.

The first bending operations are carried out each on a respective first straight portion 10a of the tube 10, and each in a bending plane passing through the longitudinal axis x of the tube, in such a manner that the tube 10 leaving the first bending device 20 comprises a corresponding plurality of first curved portions 10a' alternated with second straight portions 10b.

Preferably, the first bending device 20 is a per-se-known roller-type bending device. More specifically, the bending device 20 comprises at least three rollers, namely two end rollers 20a that are arranged on one side of the tube 10 and an intermediate roller 20b that is arranged on the other side of the tube 10 and is mounted so as to be movable transversely, that is in a direction substantially perpendicular to the longitudinal axis x. By controlling the position of the intermediate roller 20b it is possible to adjust the bending radius that is obtained with the first bending device. While the tube 10 is being moved forward, passing through the three rollers 20a, 20b, the more the intermediate roller 20b is pressed against the tube 10, the smaller the bending radius that is obtained.

The first bending device 20 is able to bend the tube 10 only in a given bending plane passing through the longitudinal axis x of the tube 10. In order to change the bending plane, it is possible to change the relative orientation of the rollers 20a, 20b with respect to the tube 10.

The first bending device 20 may further comprise a fourth roller (not shown, but anyway of per-se-known type) or front roller, having the function of stabilising the tube 10 entering the bending device while the tube is being moved forward during the bending process.

FIG. 3 also shows said step b) of the method according to the invention, wherein the tube 10 leaving the first bending device 20 undergoes said second bending operations by means of a second bending device 22 arranged downstream of the first bending device 20.

The second bending operations are carried out each on a respective second straight portion 10b of the tube 10, in such a manner that the tubular product 10' leaving the second bending device 22 comprises, between each pair of consecutive first curved portions 10a', a respective second curved portion 10b'.

Figure 4:
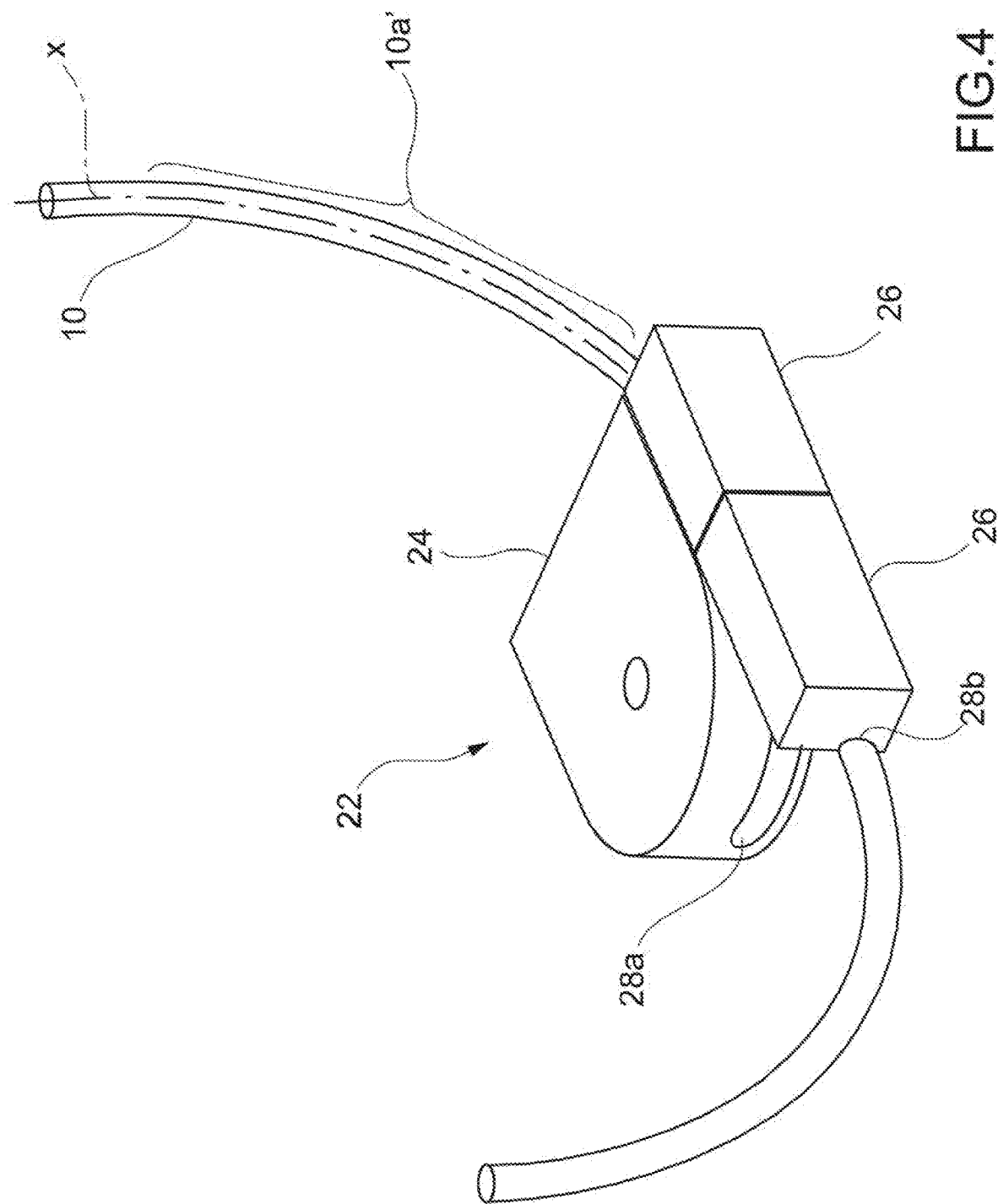
FIG. 4 is a perspective view of a die-type bending device of an apparatus for the manufacturing of tubular products according to the present invention.
Figure 5:
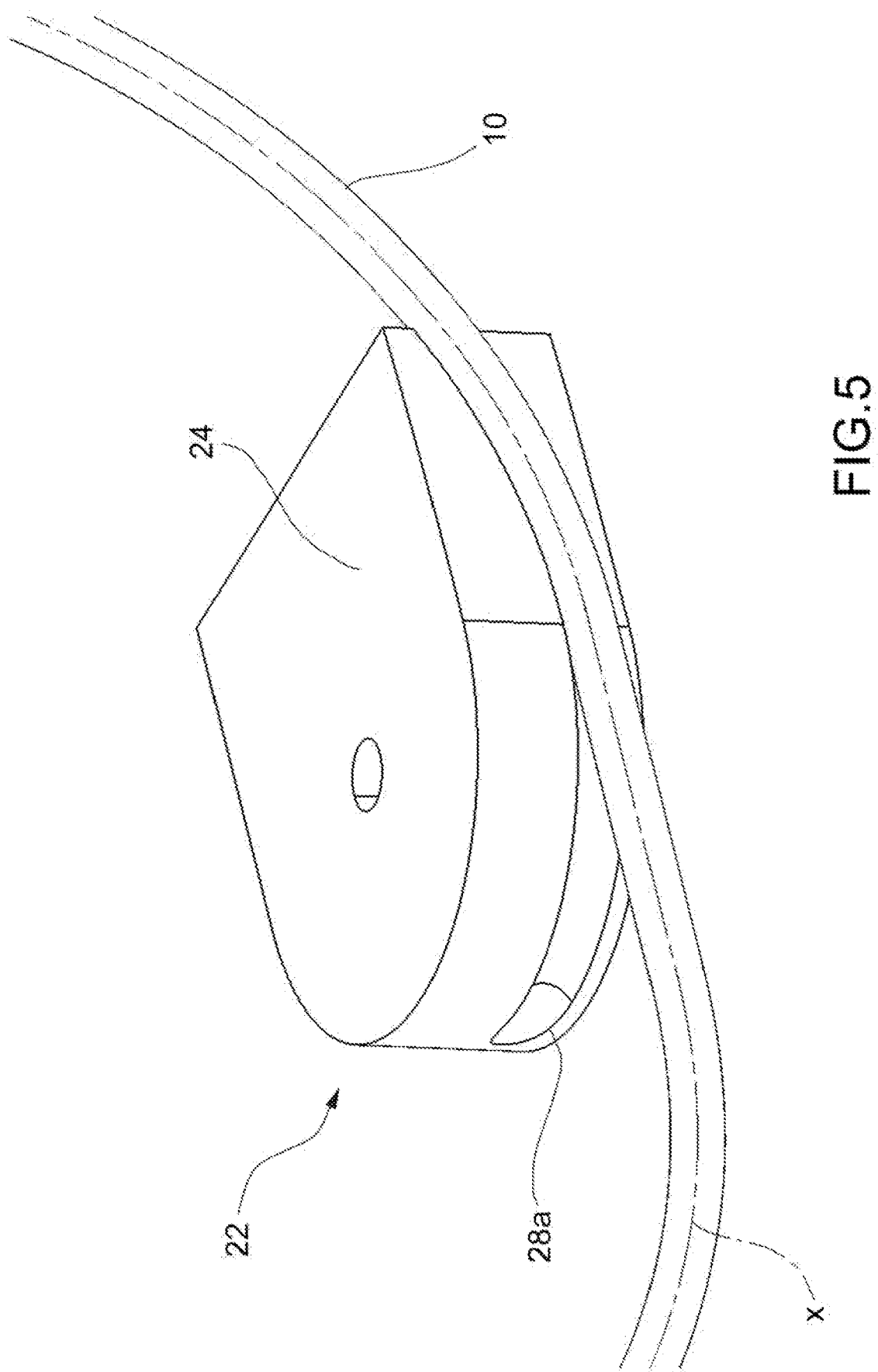
FIG. 5 is a perspective view showing in detail the die of the die-type bending device of FIG. 4.

With reference in particular to FIGS. 4 and 5, the second bending device 22 is preferably a die-type bending device, comprising, in a per-se-known manner, a mould or die 24 having a groove 28a, and at least two clamping jaws or blocks 26 having respective grooves 28b. The clamping jaws or blocks 26 are arranged to act on the tube 10, in cooperation with the die 24, in order to bend the tube 10 according to a given curve. The second bending device 22 allows to carry out both 2D and 3D bending operations. In the example of FIGS. 4 and 5 the second bending device 22 is configured to carry out 3D bending operations.

Optionally, the method may also comprise the steps of measuring the forward movement of the tube 10 and/or of marking the tube 10 during the forward movement, by means of a measuring device (not shown, yet of per-se-known type) and of a marking device (not shown, yet of per-se-known type), for example a laser or ink marking device, respectively.

The method according to the invention may be carried out, for example, first by performing all the first bending operations by means of the first bending device 20 to obtain all the first curved portions 10a' of the tubular product 10', and then by performing all the second bending operations by means of the second bending device 22 to obtain all the second curved portions 10b' of the tubular product 10'.

Alternatively, the method according to the invention may be carried out, for example, by performing in sequence the first and second bending operations by means of the first and second bending devices 20 and 22, respectively, to obtain each time a portion of the tubular product 10' comprising at least two first curved portions 10a' and, between each pair of first curved portions 10a', a second curved portion 10b'.

In particular, when it is used for manufacturing an ELM coil having a plurality of coil sections 12, the method according to the invention may be carried out either by making the coil sections altogether, that is by performing first all the first bending operations and then all the second bending operations, or by processing one coil section at a time, that is to say by performing first the first bending operations for a first coil section and then the second bending operations for the first coil section, and then repeating such operations for the following coil sections.

As already mentioned, a further aspect of the invention relates to an apparatus for manufacturing complex-curvature tubular products starting from a metal tube extending along a rectilinear longitudinal axis x. The apparatus comprises, in addition to the feeding device 18, the first bending device 20 and the second bending device 22 described above, support means (not shown, but of per-se-known type) arranged between the first bending device 20 and the second bending device 22 for supporting the tube 10 leaving the first bending device 20.

The apparatus 30 may further comprise the measuring device and/or the marking device mentioned above.

Naturally, the principle of the invention remaining unchanged, the embodiments and the modes for carrying out the invention may vary widely from those described and illustrated above purely by way of non-limiting example, without thereby departing from the scope of the invention, as defined in the appended claims.

The invention claimed is:

1. A method for manufacturing a complex-curvature tubular product starting from a metal tube extending along a rectilinear longitudinal axis (x), the method comprising the steps of:
   a) carrying out, by a first bending device, a plurality of first bending operations, each first bending operation being carried out on a respective first straight portion of the metal tube, and in a bending plane passing through said longitudinal axis (x), so that the metal tube leaving said first bending device comprises a respective plurality of first curved portions, separated by second straight portions; and
   b) carrying out, on the metal tube leaving said first bending device, by a second bending device, a plurality of second bending operations, each second bending operation being carried out on one of said second straight portions, so that the metal tube leaving said second bending device comprises, between each pair of consecutive first curved portions, one respective second curved portion, and the tubular product thus obtained comprises first and second curved portions immediately adjacent to each other.

2. The method of claim 1, wherein said first bending device is a roller bending device.

3. The method of claim 1, wherein said second bending device is a die bending device.

4. The method of claim 1, wherein first, during bending step a), all of said first curved portions of the tubular product are obtained by said first bending device, and then, during bending step b), all of said second curved portions of the tubular product are obtained by said second bending device.

5. The method of claim 1, wherein said bending steps a) and b) are carried out in sequence by said first and second bending devices, respectively, to obtain each time a respective portion of the tubular product comprising at least two of said first curved portions and at least one of said second curved portions extending between said first curved portions.

6. The method of claim 1, wherein said complex-curvature tubular product is an electro-magnetic coil, wherein said electro-magnetic coil comprises a plurality of coil sections each coil section having a plurality of curved sides and, between each pair of consecutive curved sides, a joining portion with a bending radius smaller than the bending radius of the curved sides, wherein the curved sides are obtained during bending step a) by said first bending device, and wherein joining portions are obtained during bending step b) by said second bending device.

\* \* \* \* \*